Figure 1:
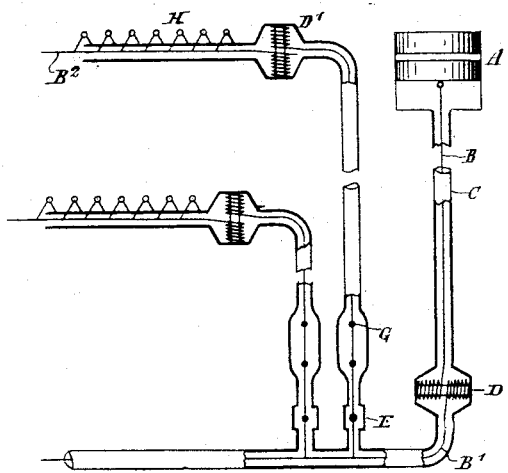

(No Model.)

S. Z. DE FERRANTI.
DISTRIBUTION OF ELECTRIC ENERGY.

No. 440,224. Patented Nov. 11, 1890.

Witnesses.

Inventor:
S. Z. de Ferranti
by his Attorneys
Baldwin, Davidson & Wight

UNITED STATES PATENT OFFICE.

SEBASTIAN ZIANI DE FERRANTI, OF HAMPSTEAD, ENGLAND.

DISTRIBUTION OF ELECTRIC ENERGY.

SPECIFICATION forming part of Letters Patent No. 440,224, dated November 11, 1890.

Application filed February 19, 1889. Serial No. 300,459. (No model.)

*To all whom it may concern:*

Be it known that I, SEBASTIAN ZIANI DE FERRANTI, electrician, a subject of the Queen of Great Britain, residing at 120 Fellowes Road, Hampstead, in the county of Middlesex, England, have invented certain new and useful Improvements in the Distribution of Electrical Energy, of which the following is a specification.

The object of my invention is to enable towns or other places to be supplied in a practical manner with electrical energy from dynamo-electric machines or generators situated at a distance from them. To effect this I employ at the generating-station an alternating-current dynamo-electric machine wound to give a high electro-motive force—say ten thousand volts. From the generating-station mains are led to stations in the town or towns or places where the current is to be used. Transformers situated at these stations reduce the current to a practical limit for distribution in the town, and mains take this reduced current to the different houses or blocks of houses or small distributing-stations which are to be supplied with current. Other transformers placed at these stations or houses reduce the current, which is still of too high a tension, to a tension, say, of fifty to one hundred volts, such as may be required in lamps used for electric lighting. For example, at the generating-station an alternating-current dynamo wound to give a high electro-motive force—say ten thousand volts—may be used to supply current to mains going to the distributing-stations. The transformers at these stations may have their primaries wound in relation to their secondaries in a reducing ratio of, say, four to one. Other mains leading from the secondaries of these transformers convey the current to sub-stations or houses, where transformers are provided, again wound in a reducing ratio—say twenty-four to one.

By providing for reducing the current by two or more reductions in the above manner currents of very high intensity may be used in the mains leading from the dynamo to the distant towns or places, while in the towns or places where such high currents could not be conveyed with safety the current is reduced to practical limits, and in the houses or places where the current is to be used the intensity is reduced to a limit at which the current can be used with safety. For conveying the current I use concentric conductors, as described in other applications for patents made by me.

The converters or transformers I use are made with closed magnetic circuits. They may be formed in the manner described in the specification of my patent, No. 389,838.

The drawings annexed show diagram views of apparatus for effecting a twofold reduction in the current passing from a dynamo, as above described.

Figure 2:
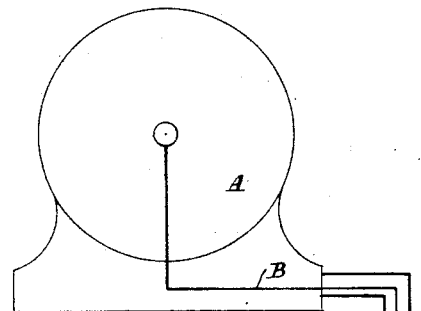
Figure 2:
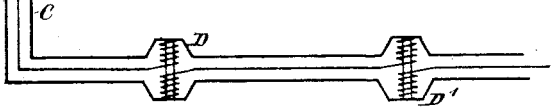

Figure 1 is a diagram illustrating the application of the invention to systems of electric lighting; Fig. 2, a similar diagram illustrating generally the system of twofold reduction of the current.

In Fig. 2, A is a dynamo producing alternating current of high tension. B C are concentric conductors passing therefrom. D is a converter inclosed in a casing forming part of the outer conductor C. The primary of this converter is connected at one end to the inner high-tension conductor B and at the other end to the casing. The secondary is also connected at one end to the casing and at the other to a tertiary conductor B', which passes through a continuation of the outer conductor C to a second converter D', similarly inclosed in a casing forming part of the outer conductor. The current of reduced tension induced in the secondary of this converter is led off by a conductor B² for distribution.

In Fig. 1 the parts are marked with the same letters of reference. E represents a switch, and G a fuse on each branch leading to a second converter D'. H are lamp-circuits fed with current from the secondary of these second converters.

I claim as my invention—

1. The combination of a dynamo-electric machine A, concentric conductors B C, insulated from one another, leading therefrom, a converter D, inclosed within the outer conductor C, and a conductor B', passing through a continuation of the conductor C, conveying current induced in the secondary of the converter D to branch mains of concentric conductors and through them to second converters D′, also inclosed in the outer conductor C.

2. The combination of a high-tension alternating-current dynamo-electric machine A, a converter D, concentric conductors B and C, insulated from one another, connecting the dynamo with the primary of the converter D, another converter D′, a secondary circuit of concentric conductors conveying current of lower tension and connecting the converters D and D′, and a tertiary circuit connecting the converter D′ with electric lamps or other appliances for utilizing the electric current.

3. The combination of a dynamo-electric machine A, concentric conductors B and C, insulated from one another, leading therefrom, a converter D, having a casing forming part of the outer conductor C, another converter D′, a secondary circuit connecting the converters D and D′, and a tertiary circuit connecting the converter D′ with the electric lamps or other appliances for utilizing the electric current.

4. The combination of a dynamo-electric machine A, concentric conductors B and C, insulated from one another, leading therefrom, a converter D, having an inclosing-casing forming part of the outer conductor C, and a conductor B′, passing through a continuation of the outer conductor C, conveying current induced in the secondary of the converter D to branch mains of concentric conductors and through them to secondary converters D′.

SEBASTIAN ZIANI DE FERRANTI.

Witnesses:
GEO. J. B. FRANKLIN,
HERBERT E. DALE,
*Both of* 17 *Gracechurch Street, London, E. C.*